United States Patent
O'Connor et al.

(10) Patent No.: US 10,914,274 B1
(45) Date of Patent: Feb. 9, 2021

(54) FUEL OXYGEN REDUCTION UNIT WITH PLASMA REACTOR

(71) Applicant: General Electric Company, Schenectady, NY (US)

(72) Inventors: Ethan Patrick O'Connor, Hamilton, OH (US); Christian Xavier Stevenson, Blanchester, OH (US); Timothy John Sommerer, Ballston Spa, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/567,657

(22) Filed: Sep. 11, 2019

(51) Int. Cl.
| | | |
|---|---|---|
| *F02M 27/04* | (2006.01) | |
| *B64D 37/34* | (2006.01) | |
| *B01D 53/32* | (2006.01) | |
| *B01D 53/14* | (2006.01) | |

(52) U.S. Cl.
CPC ......... *F02M 27/042* (2013.01); *B01D 53/323* (2013.01); *B64D 37/34* (2013.01); *B01D 53/1475* (2013.01); *B01D 2257/102* (2013.01); *B01D 2257/104* (2013.01); *B01D 2259/4575* (2013.01)

(58) Field of Classification Search
CPC ...... F02M 27/042; F02M 27/04; F02M 27/00; B01D 53/323; B01D 53/1475; B01D 2257/102; B01D 2259/4575; B01D 2257/104; B64D 37/34
See application file for complete search history.

(56) References Cited

U.S. PATENT DOCUMENTS

| | | | |
|---|---|---|---|
| 2,582,842 | A | 1/1952 | Messinger |
| 2,720,313 | A | 10/1955 | Pattison |
| 2,893,628 | A | 7/1959 | Herman |
| 3,050,240 | A | 8/1962 | Darnell |
| 3,178,105 | A | 4/1965 | Darnell |
| 3,590,559 | A | 7/1971 | Bragg |
| 3,847,298 | A | 11/1974 | Hamilton |

(Continued)

FOREIGN PATENT DOCUMENTS

| | | |
|---|---|---|
| EP | 2003311 A2 | 12/2008 |
| EP | 3018304 A1 | 5/2016 |

(Continued)

OTHER PUBLICATIONS

U.S. Appl. No. 15/819,443, filed Nov. 21, 2017.

(Continued)

*Primary Examiner* — Jacob M Amick
(74) *Attorney, Agent, or Firm* — Dority & Manning, P.A.

(57) ABSTRACT

A fuel oxygen reduction unit for an aeronautical engine is provided. The fuel oxygen reduction unit includes a stripping gas line that provides a stripping gas flow and a plasma reactor in fluid communication with the stripping gas line. The plasma reactor includes a plasma reactor gas inlet that receives the stripping gas flow from the stripping gas line and a plasma reactor gas outlet that provides the stripping gas flow back to the stripping gas line, the plasma reactor configured to reduce a free oxygen content of the stripping gas flow such that an outlet free oxygen content of the stripping gas flow that exits the plasma reactor gas outlet is lower than an inlet free oxygen content of the stripping gas flow that enters the plasma reactor gas inlet.

18 Claims, 6 Drawing Sheets

(56) References Cited

U.S. PATENT DOCUMENTS

| | | |
|---|---|---|
| 3,895,243 A | 7/1975 | Amend et al. |
| 3,902,658 A | 9/1975 | Madsen |
| 4,169,567 A | 10/1979 | Tamura |
| 4,170,116 A | 10/1979 | Williams |
| 4,264,844 A | 4/1981 | Axe et al. |
| 4,449,372 A | 5/1984 | Rilett |
| 4,503,682 A | 3/1985 | Rosenblatt |
| 4,505,124 A | 3/1985 | Mayer |
| 4,550,573 A | 11/1985 | Rannenberg |
| 4,600,413 A | 7/1986 | Sugden |
| 4,714,139 A | 12/1987 | Lorenz et al. |
| 4,738,779 A | 4/1988 | Carroll et al. |
| 4,755,197 A | 7/1988 | Benson et al. |
| 4,773,212 A | 9/1988 | Griffin et al. |
| 5,149,018 A | 9/1992 | Clark |
| 5,267,608 A | 12/1993 | Coffinberry |
| 5,341,636 A | 8/1994 | Paul |
| 5,452,573 A | 9/1995 | Glickstein et al. |
| 5,587,068 A | 12/1996 | Aho, Jr. et al. |
| 5,622,621 A | 4/1997 | Kramer |
| 5,667,168 A | 9/1997 | Fluegel |
| 5,722,241 A | 3/1998 | Huber |
| 5,724,806 A | 3/1998 | Homer |
| 5,904,836 A | 5/1999 | Lee et al. |
| 6,134,876 A | 10/2000 | Hines et al. |
| 6,176,078 B1 * | 1/2001 | Balko .................. F01N 3/2066 60/274 |
| 6,182,435 B1 | 2/2001 | Niggemann et al. |
| 6,250,097 B1 | 6/2001 | Lui et al. |
| 6,294,091 B1 | 9/2001 | Hoff |
| 6,415,595 B1 | 7/2002 | Wilmot, Jr. et al. |
| 6,435,454 B1 | 8/2002 | Engelhardt |
| 6,453,660 B1 | 9/2002 | Johnson et al. |
| 6,701,717 B2 | 3/2004 | Flatman et al. |
| 6,702,729 B2 | 3/2004 | Mazzuca |
| 6,892,710 B2 | 5/2005 | Ekstam |
| 6,939,392 B2 | 9/2005 | Huang et al. |
| 7,093,437 B2 | 8/2006 | Spadaccini et al. |
| 7,114,337 B2 | 10/2006 | Cazalens et al. |
| 7,260,926 B2 | 8/2007 | Sabatino et al. |
| 7,334,407 B2 | 2/2008 | Spadaccini et al. |
| 7,377,098 B2 | 5/2008 | Walker et al. |
| 7,387,602 B1 | 6/2008 | Kirsch |
| 7,398,641 B2 | 7/2008 | Stretton et al. |
| 7,431,818 B2 | 10/2008 | Cipollini |
| 7,459,081 B2 | 12/2008 | Koenig et al. |
| 7,509,795 B2 | 3/2009 | Allen |
| 7,536,851 B2 | 5/2009 | McLain |
| 7,569,099 B2 | 8/2009 | Coffin et al. |
| 7,628,965 B2 | 12/2009 | Johnson et al. |
| 7,694,916 B2 | 4/2010 | Limaye et al. |
| 7,735,670 B2 | 6/2010 | Zaki et al. |
| 7,744,827 B2 | 6/2010 | Vanderspurt et al. |
| 7,824,470 B2 | 11/2010 | Chiappetta et al. |
| 7,836,680 B2 | 11/2010 | Schwarz et al. |
| 7,882,704 B2 | 2/2011 | Chen |
| 7,896,292 B2 | 3/2011 | Limaye et al. |
| 7,905,259 B2 | 3/2011 | Johnson et al. |
| 7,966,807 B2 | 6/2011 | Norris et al. |
| 7,987,676 B2 | 8/2011 | Ast et al. |
| 8,015,813 B2 | 9/2011 | Cazalens et al. |
| 8,055,437 B2 | 11/2011 | Proietty et al. |
| 8,141,360 B1 | 3/2012 | Huber |
| 8,177,884 B2 | 5/2012 | Schmidt et al. |
| 8,231,714 B2 | 7/2012 | Cornet et al. |
| 8,242,404 B2 | 8/2012 | Miller et al. |
| 8,261,528 B2 | 9/2012 | Chillar et al. |
| 8,388,830 B2 | 3/2013 | Sohn et al. |
| 8,450,020 B2 | 5/2013 | Sinha et al. |
| 8,499,567 B2 | 8/2013 | Hagh et al. |
| 8,499,822 B2 | 8/2013 | Bulin et al. |
| 8,522,572 B2 | 9/2013 | Coffinberry et al. |
| 8,602,362 B2 | 12/2013 | Buchwald |
| 8,663,996 B2 | 3/2014 | Beeson |
| 8,765,070 B2 | 7/2014 | Norton et al. |
| 8,789,377 B1 | 7/2014 | Brostmeyer |
| 8,821,362 B2 | 9/2014 | Kidd et al. |
| 8,828,344 B2 | 9/2014 | K-WLam et al. |
| 8,858,161 B1 | 10/2014 | Ryznic et al. |
| 8,944,367 B2 | 2/2015 | Bystry, Jr. et al. |
| 8,978,353 B2 | 3/2015 | Norton et al. |
| 8,984,884 B2 | 3/2015 | Xu et al. |
| 9,014,791 B2 | 4/2015 | Held |
| 9,038,397 B2 | 5/2015 | Papa et al. |
| 9,120,580 B2 | 9/2015 | Sampath |
| 9,144,768 B2 | 9/2015 | Tichborne et al. |
| 9,162,162 B2 | 10/2015 | Yount |
| 9,231,267 B2 | 1/2016 | McAlister |
| 9,435,246 B2 | 9/2016 | Devarakonda |
| 9,567,095 B2 | 2/2017 | McCarthy et al. |
| 9,580,185 B2 | 2/2017 | Rhoden et al. |
| 9,656,187 B2 | 5/2017 | Lo et al. |
| 9,687,773 B2 | 6/2017 | Johnson et al. |
| 9,724,625 B2 | 8/2017 | Lo |
| 9,752,507 B2 | 9/2017 | Selstad et al. |
| 9,771,867 B2 | 9/2017 | Karam et al. |
| 9,834,315 B2 | 12/2017 | Lo et al. |
| 9,863,322 B2 | 1/2018 | Williams et al. |
| 9,885,290 B2 | 2/2018 | Della-Fera et al. |
| 9,897,054 B2 | 2/2018 | Lo et al. |
| 10,060,618 B2 | 8/2018 | Juan |
| 2007/0163433 A1 * | 7/2007 | Chen .................. B01D 67/0006 95/46 |
| 2009/0133380 A1 | 5/2009 | Donnerhack |
| 2009/0158739 A1 | 6/2009 | Messmer |
| 2009/0165436 A1 | 7/2009 | Herbon et al. |
| 2009/0188234 A1 | 7/2009 | Suciu et al. |
| 2010/0212857 A1 | 8/2010 | Bulin et al. |
| 2010/0294128 A1 * | 11/2010 | Schmidt .................. B64D 37/34 95/46 |
| 2010/0313591 A1 | 12/2010 | Lents et al. |
| 2011/0262309 A1 | 10/2011 | Limaye et al. |
| 2012/0216502 A1 | 8/2012 | Freund et al. |
| 2012/0216677 A1 | 8/2012 | Koenig et al. |
| 2013/0186100 A1 | 7/2013 | Rhoden et al. |
| 2014/0165570 A1 | 6/2014 | Herring |
| 2014/0205446 A1 | 7/2014 | Patsouris et al. |
| 2014/0345292 A1 | 11/2014 | Diaz et al. |
| 2014/0360153 A1 | 12/2014 | Papa et al. |
| 2015/0000291 A1 | 1/2015 | Smith et al. |
| 2015/0040986 A1 | 2/2015 | Tichborne et al. |
| 2015/0072850 A1 | 3/2015 | Derrick et al. |
| 2015/0159867 A1 | 6/2015 | Patrick et al. |
| 2016/0003160 A1 | 1/2016 | Hagshenas |
| 2016/0096629 A1 | 4/2016 | Vaisman |
| 2016/0108814 A1 | 4/2016 | Schmitz |
| 2016/0138431 A1 | 5/2016 | Lear, Jr. |
| 2016/0167802 A1 | 6/2016 | Lo et al. |
| 2016/0208759 A1 | 7/2016 | Lo et al. |
| 2016/0245144 A1 | 8/2016 | Selberg et al. |
| 2016/0290214 A1 | 10/2016 | Ekanayake et al. |
| 2016/0305440 A1 | 10/2016 | Laboda et al. |
| 2016/0369700 A1 | 12/2016 | Ribarov et al. |
| 2017/0030266 A1 | 2/2017 | Cerny et al. |
| 2017/0096910 A1 | 4/2017 | Raimarckers et al. |
| 2017/0113807 A1 | 4/2017 | Burnell et al. |
| 2017/0114721 A1 | 4/2017 | Miller et al. |
| 2017/0141419 A1 | 5/2017 | Wu et al. |
| 2017/0159566 A1 | 6/2017 | Sennoun et al. |
| 2017/0167382 A1 | 6/2017 | Miller et al. |
| 2017/0291714 A1 | 10/2017 | Corman |
| 2018/0016025 A1 | 1/2018 | Rheaume et al. |
| 2018/0056233 A1 | 3/2018 | Henson et al. |
| 2018/0056234 A1 | 3/2018 | Weng et al. |
| 2018/0071659 A1 | 3/2018 | Rhoden |
| 2018/0118367 A1 | 5/2018 | Rheaume et al. |
| 2020/0086239 A1 | 3/2020 | Cordatos et al. |

FOREIGN PATENT DOCUMENTS

| | | |
|---|---|---|
| EP | 3075957 A1 | 10/2016 |
| EP | 3623030 A1 | 3/2020 |
| GB | 2136880 A | 9/1984 |
| GB | 2204361 A | 11/1988 |

(56) References Cited

FOREIGN PATENT DOCUMENTS

| | | |
|---|---|---|
| JP | S5932893 U | 2/1984 |
| WO | WO 02/16743 A1 | 2/2002 |
| WO | WO 02/38938 A1 | 5/2002 |
| WO | WO2006/079438 A1 | 8/2006 |
| WO | WO2011/038188 A1 | 3/2011 |

OTHER PUBLICATIONS

U.S. Appl. No. 15/819,327, filed Nov. 28, 2017.
Landfill, Sewage, Biogas, Coal, Seam & Mines Gas Separation/Filtration, Kelburn Engineering—LandfillGas and Air Separation, 3 pages. www.kelburneng.com/uk//landfill-gas-bio-gas-sewer-gas.php.

* cited by examiner

FUEL OXYGEN REDUCTION UNIT WITH PLASMA REACTOR

FIELD

The present subject matter relates generally to a fuel oxygen reduction unit for an engine and a method of operating the same.

BACKGROUND

Typical aircraft propulsion systems include one or more gas turbine engines. The gas turbine engines generally include a turbomachine, the turbomachine including, in serial flow order, a compressor section, a combustion section, a turbine section, and an exhaust section. In operation, air is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Certain operations and systems of the gas turbine engines and aircraft may generate a relatively large amount of heat. Fuel has been determined to be an efficient heat sink to receive at least some of such heat during operations due at least in part to its heat capacity and an increased efficiency in combustion operations that may result from combusting higher temperature fuel.

However, heating the fuel up without properly conditioning the fuel may cause the fuel to "coke," or form solid particles that may clog up certain components of the fuel system, such as the fuel nozzles. Reducing an amount of oxygen in the fuel may effectively reduce the likelihood that the fuel will coke beyond an unacceptable amount. Fuel oxygen conversion systems have been proposed for such a purpose.

BRIEF DESCRIPTION

Aspects and advantages of the invention will be set forth in part in the following description, or may be obvious from the description, or may be learned through practice of the invention.

In one exemplary embodiment of the present disclosure, a fuel oxygen reduction unit for an aeronautical engine is provided. The fuel oxygen reduction unit includes a stripping gas line that provides a stripping gas flow and a plasma reactor in fluid communication with the stripping gas line, the plasma reactor having a plasma reactor gas inlet that receives the stripping gas flow from the stripping gas line and a plasma reactor gas outlet that provides the stripping gas flow back to the stripping gas line, the plasma reactor configured to reduce an oxygen content of the stripping gas flow such that an outlet oxygen content of the stripping gas flow that exits the plasma reactor gas outlet is lower than an inlet oxygen content of the stripping gas flow that enters the plasma reactor gas inlet.

In certain exemplary embodiments the plasma reactor includes a reactor tube that provides repetitive plasma power pulses to the stripping gas flow flowing through the plasma reactor.

In certain exemplary embodiments the plasma reactor discharges an electric field to break and reform chemical bonds of the stripping gas flow thereby reducing the outlet oxygen content of the stripping gas flow that exits the plasma reactor gas outlet.

In certain exemplary embodiments the plasma reactor reduces the outlet oxygen content of the stripping gas flow that exits the plasma reactor gas outlet to less than approximately 0.1% percent (0.1%) oxygen (O2) by mass.

In another exemplary embodiment of the present disclosure, a fuel oxygen reduction unit for an aeronautical engine is provided. The fuel oxygen reduction unit includes a stripping gas line that provides a stripping gas flow; a fuel line that provides an inlet fuel flow; a contactor in fluid communication with the stripping gas line and the fuel line, wherein the contactor mixes the inlet fuel flow with the stripping gas flow to form a fuel/gas mixture flow; and a separator in fluid communication with the contactor, wherein the separator receives the fuel/gas mixture flow from the contactor and separates the fuel/gas mixture flow back into the stripping gas flow provided to the stripping gas line and an outlet fuel flow. The fuel oxygen reduction unit includes a plasma reactor in fluid communication with the separator, the plasma reactor having a plasma reactor gas inlet that receives the stripping gas flow that exits the separator and a plasma reactor gas outlet that provides the stripping gas flow back to the stripping gas line, the plasma reactor configured to reduce an oxygen content of the stripping gas flow such that an outlet oxygen content of the stripping gas flow that exits the plasma reactor gas outlet is lower than an inlet oxygen content of the stripping gas flow that enters the plasma reactor gas inlet.

In certain exemplary embodiments the plasma reactor is downstream of the separator.

In certain exemplary embodiments the plasma reactor is between, and in fluid communication with, the separator and the contactor.

In certain exemplary embodiments the plasma reactor includes a reactor tube that provides repetitive plasma power pulses to the stripping gas flow flowing through the plasma reactor.

In certain exemplary embodiments the plasma reactor discharges an electric field to break and reform chemical bonds of the stripping gas flow thereby reducing the outlet oxygen content of the stripping gas flow that exits the plasma reactor gas outlet.

In certain exemplary embodiments the plasma reactor reduces the outlet oxygen content of the stripping gas flow that exits the plasma reactor gas outlet to less than approximately 0.1% percent (0.1%) oxygen (O2) by mass.

In certain exemplary embodiments the contactor includes a contactor gas inlet, a contactor fuel inlet, and a contactor outlet; the contactor gas inlet is in fluid communication with the stripping gas line; and the contactor fuel inlet is in fluid communication with the fuel line.

In certain exemplary embodiments the contactor gas inlet receives the stripping gas flow that exits the plasma reactor gas outlet.

In certain exemplary embodiments the outlet fuel flow has a lower oxygen content than the inlet fuel flow.

In an exemplary aspect of the present disclosure, a method is provided for operating a fuel oxygen reduction unit for an aeronautical engine. The method includes mixing in a contactor of the fuel oxygen reduction unit an inlet fuel flow received from a fuel line with a stripping gas flow received from a stripping gas line to form a fuel/gas mixture flow; receiving the fuel/gas mixture flow in a separator of the fuel oxygen reduction unit; separating the fuel/gas mixture flow back into the stripping gas flow provided to the stripping gas line and an outlet fuel flow; and reducing an oxygen content of the stripping gas flow that exits the separator by flowing the stripping gas flow through a plasma reactor.

In certain exemplary aspects reducing the oxygen content of the stripping gas flow that exits the separator by flowing the stripping gas flow through the plasma reactor comprises providing the plasma reactor in fluid communication with the separator, the plasma reactor having a plasma reactor gas inlet that receives the stripping gas flow that exits the separator and a plasma reactor gas outlet that provides the stripping gas flow back to the stripping gas line, the plasma reactor configured to reduce the oxygen content of the stripping gas flow such that an outlet oxygen content of the stripping gas flow that exits the plasma reactor gas outlet is lower than an inlet oxygen content of the stripping gas flow that enters the plasma reactor gas inlet.

In certain exemplary aspects the plasma reactor includes a reactor tube that provides repetitive plasma power pulses to the stripping gas flow flowing through the plasma reactor.

In certain exemplary aspects the plasma reactor discharges an electric field to break and reform chemical bonds of the stripping gas flow thereby reducing the outlet oxygen content of the stripping gas flow that exits the plasma reactor gas outlet.

In certain exemplary aspects the outlet fuel flow has a lower oxygen content than the inlet fuel flow.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A fuel oxygen reduction unit of the present disclosure includes a plasma reactor configured to reduce a free oxygen content of a stripping gas flow such that an outlet free oxygen content of the stripping gas flow that exits the plasma reactor is lower than an inlet free oxygen content of the stripping gas flow that enters the plasma reactor. The plasma reactor of the present disclosure may provide a lower temperature reaction with a lower energy input/lower power requirement into a flow of stripping gas than conventional systems. The plasma reactor of the present disclosure does not require a start-up time due to warming up of the system and will start breaking chemical bonds and removing oxygen almost immediately. The plasma reactor of the present disclosure may require less controls and less monitoring than conventional systems.

Figure 1:
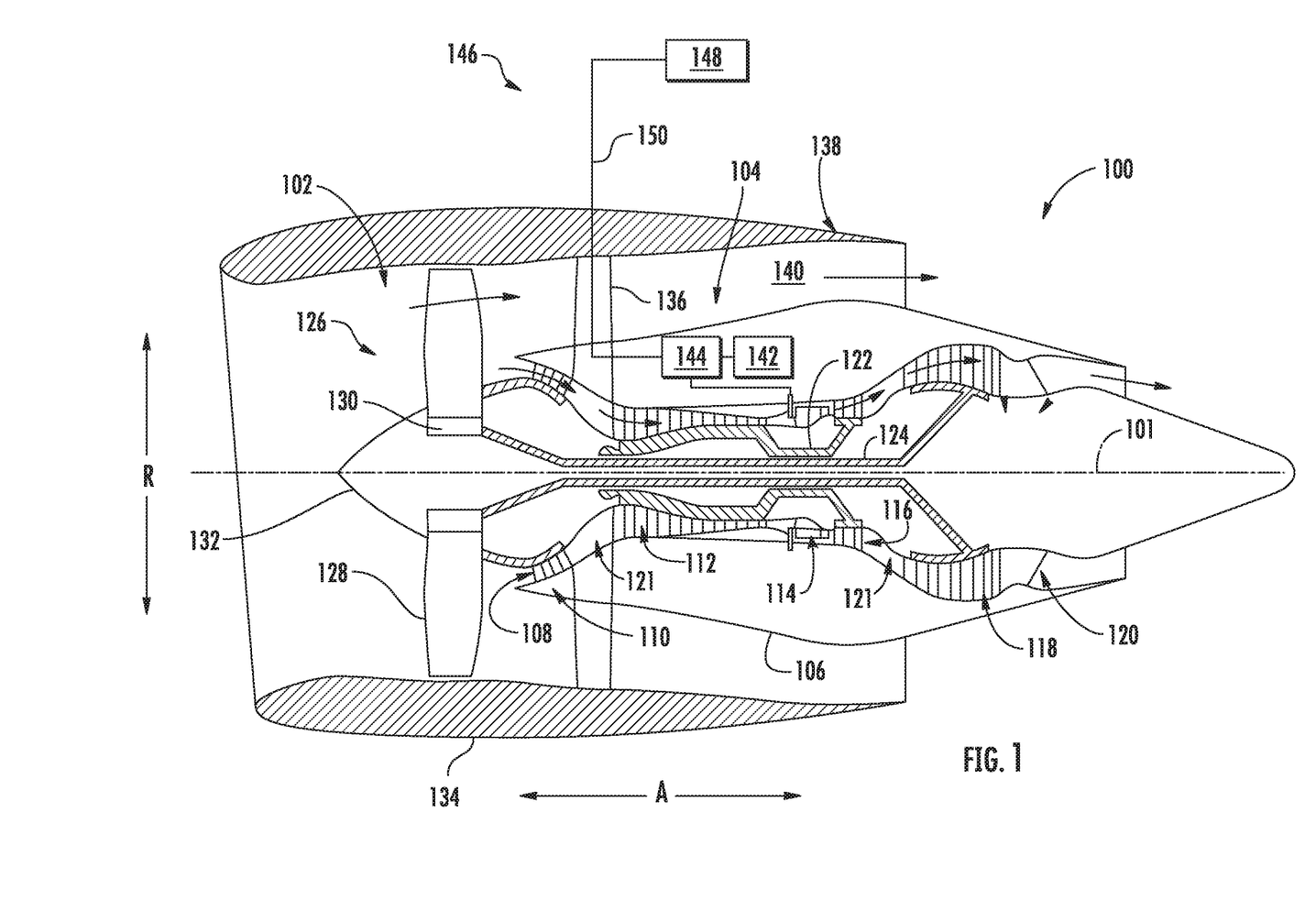
FIG. 1 is a schematic, cross-sectional view of a gas turbine engine in accordance with an exemplary embodiment of the present disclosure.

Referring now to the drawings, wherein identical numerals indicate the same elements throughout the figures, FIG. 1 provides a schematic, cross-sectional view of an engine in accordance with an exemplary embodiment of the present disclosure. The engine may be incorporated into a vehicle. For example, the engine may be an aeronautical engine incorporated into an aircraft. Alternatively, however, the engine may be any other suitable type of engine for any other suitable aircraft.

For the embodiment depicted, the engine is configured as a high bypass turbofan engine 100. As shown in FIG. 1, the turbofan engine 100 defines an axial direction A (extending parallel to a longitudinal centerline 101 provided for reference), a radial direction R, and a circumferential direction (extending about the axial direction A; not depicted in FIG. 1). In general, the turbofan 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flowpath 121 extending from the annular inlet 108 to the jet nozzle exhaust section 120. The turbofan engine further includes one or more drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The fan blades 128 and disk 130 are together rotatable about the longitudinal axis 101 by the LP shaft 124. The disk 130 is covered by rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define a bypass airflow passage 140 therebetween.

Referring still to FIG. 1, the turbofan engine 100 additionally includes an accessory gearbox 142, a fuel oxygen reduction unit 144, and a fuel delivery system 146. For the embodiment shown, the accessory gearbox 142 is located within the cowling/outer casing 106 of the turbomachine 104. Additionally, it will be appreciated that, although not depicted schematically in FIG. 1, the accessory gearbox 142 may be mechanically coupled to, and rotatable with, one or more shafts or spools of the turbomachine 104. For example, in at least certain exemplary embodiments, the accessory gearbox 142 may be mechanically coupled to, and rotatable with, the HP shaft 122. Further, for the embodiment shown, the fuel oxygen reduction unit 144 is coupled to, or otherwise rotatable with, the accessory gearbox 142. In such a manner, it will be appreciated that the exemplary fuel oxygen reduction unit 144 is driven by the accessory gearbox 142. Notably, as used herein, the term "fuel oxygen reduction" generally means a device capable of reducing a free oxygen content of the fuel.

Moreover, the fuel delivery system 146 generally includes a fuel source 148, such as a fuel tank, and one or more fuel lines 150. The one or more fuel lines 150 provide a fuel flow through the fuel delivery system 146 to the combustion section 114 of the turbomachine 104 of the turbofan engine 100.

It will be appreciated, however, that the exemplary turbofan engine 100 depicted in FIG. 1 is provided by way of example only. In other exemplary embodiments, any other suitable engine may be utilized with aspects of the present disclosure. For example, in other embodiments, the engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine depicted in FIG. 1 is shown schematically as a direct drive, fixed-pitch turbofan engine 100, in other embodiments, a gas turbine engine of the present disclosure may be a geared gas turbine engine (i.e., including a gearbox between the fan 126 and shaft driving the fan, such as the LP shaft 124), may be a variable pitch gas turbine engine (i.e., including a fan 126 having a plurality of fan blades 128 rotatable about their respective pitch axes), etc. Further, although not depicted herein, in other embodiments the gas turbine engine may be any other suitable type of gas turbine engine, such as an industrial gas turbine engine incorporated into a power generation system, a nautical gas turbine engine, etc. Further, still, in alternative embodiments, aspects of the present disclosure may be incorporated into, or otherwise utilized with, any other type of engine, such as reciprocating engines.

Moreover, it will be appreciated that although for the embodiment depicted, the turbofan engine 100 includes the fuel oxygen reduction unit 144 positioned within the turbomachine 104, i.e., within the casing 106 of the turbomachine 104, in other embodiments, the fuel oxygen reduction unit 144 may be positioned at any other suitable location. For example, in other embodiments, the fuel oxygen reduction unit 144 may instead be positioned remote from the turbofan engine 100. Additionally, in other embodiments, the fuel oxygen reduction unit 144 may additionally or alternatively be driven by other suitable power sources such as an electric motor, a hydraulic motor, or an independent mechanical coupling to the HP or LP shaft, etc.

Figure 2:
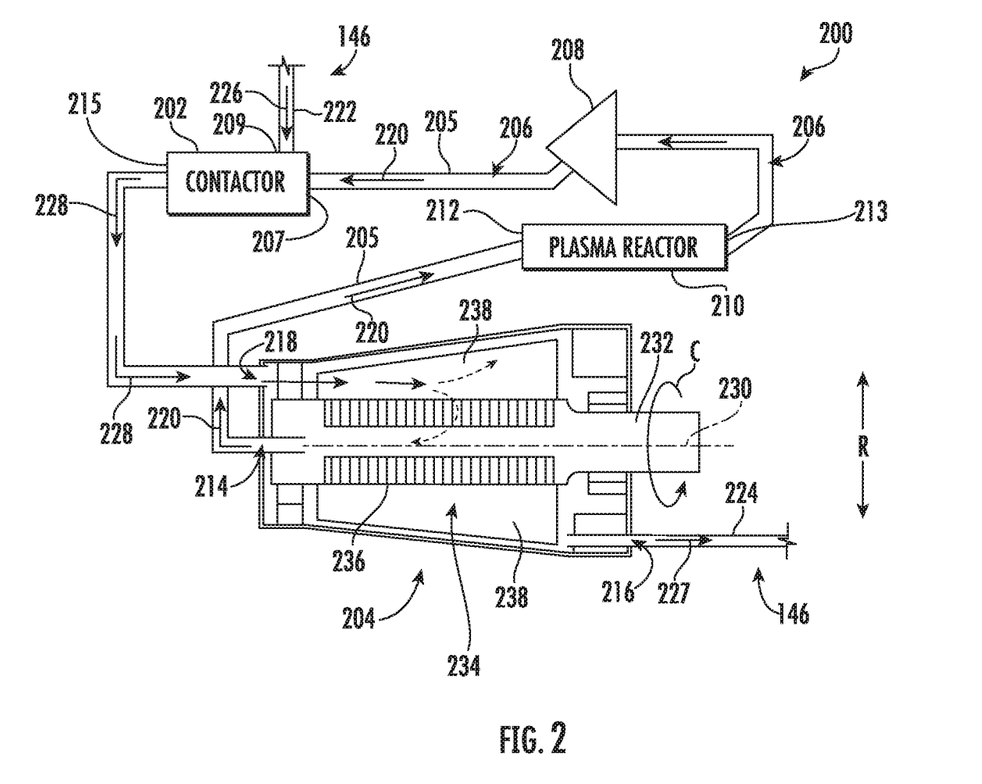
FIG. 2 is a schematic view of a fuel oxygen reduction unit in accordance with an exemplary embodiment of the present disclosure.

Referring now to FIG. 2, a schematic drawing of a fuel oxygen reduction unit 200 for an aeronautical engine, e.g., a gas turbine engine, in accordance with an exemplary aspect of the present disclosure is provided. In at least certain exemplary embodiments, the exemplary fuel oxygen reduction unit 200 depicted in FIG. 2 may be incorporated into, e.g., the exemplary engine 100 described above with reference to FIG. 1 (e.g., may be the fuel oxygen reduction unit 144 depicted in FIG. 1 and described above).

As will be appreciated from the discussion herein, the fuel oxygen reduction unit 200 of FIG. 2 generally includes a contactor 202, a separator 204, and a plasma reactor 210. Referring to FIG. 2, the plasma reactor 210 is downstream of the separator 204. In one embodiment, the plasma reactor 210 is between, and in fluid communication with, the separator 204 and the contactor 202. In the exemplary embodiment shown in FIG. 2, a gas boost pump 208 is downstream of the plasma reactor 210 as described in more detail below.

A fuel oxygen reduction unit 200 of the present disclosure includes a plasma reactor 210 configured to reduce a free oxygen content of a stripping gas flow 220 such that an outlet free oxygen content of the stripping gas flow 220 that exits the plasma reactor 210 is lower than an inlet free oxygen content of the stripping gas flow 220 that enters the plasma reactor 210. The plasma reactor 210 of the present disclosure may provide a lower temperature reaction with a lower energy input/lower power requirement into a flow of stripping gas than conventional systems. The plasma reactor 210 of the present disclosure does not require a start-up time due to warming up of the system and will start breaking chemical bonds and removing oxygen almost immediately. The plasma reactor 210 of the present disclosure may require less controls and less monitoring than conventional systems.

The exemplary contactor 202 depicted may be configured in any suitable manner to substantially mix a received gas and liquid flow, as will be described below. For example, the contactor 202 may, in certain embodiments be a mechanically driven contactor (e.g., having paddles for mixing the received flows), or alternatively may be a passive contactor for mixing the received flows using, at least in part, a pressure and/or flowrate of the received flows. For example, a passive contactor may include one or more tabulators, a venturi mixer, etc.

Moreover, the exemplary fuel oxygen reduction unit 200 includes a stripping gas line 205, and more particularly, includes a plurality of stripping gas lines 205, which together at least in part define a circulation gas flowpath 206 extending from the separator 204 to the contactor 202. In certain exemplary embodiments, the circulation gas flowpath 206 may be formed of any combination of one or more conduits, tubes, pipes, etc. in addition to the plurality stripping gas lines 205 and structures or components within the circulation gas flowpath 206.

As will be explained in greater detail, below, the fuel oxygen reduction unit 200 generally provides for a flow of stripping gas 220 through the plurality of stripping gas lines 205 and stripping gas flowpath 206 during operation. It will be appreciated that the term "stripping gas" is used herein as a term of convenience to refer to a gas generally capable of performing the functions described herein. The stripping gas 220 flowing through the stripping gas flowpath/circulation gas flowpath 206 may be an actual stripping gas functioning to strip oxygen from the fuel within the contactor, or alternatively may be a sparging gas bubbled through a liquid fuel to reduce a free oxygen content of such fuel. For example, as will be discussed in greater detail below, the stripping gas 220 may be an inert gas, such as Nitrogen or Carbon Dioxide ($CO_2$), a gas mixture made up of at least 50% by mass inert gas, or some other gas or gas mixture having a relatively low oxygen content. In some exemplary embodiments, a gas mixture can be made up of at least 95% by mass inert gas, or some other gas or gas mixture having a relatively low oxygen content.

Moreover, for the exemplary fuel oxygen reduction unit depicted in FIG. 2, the fuel oxygen reduction unit 200 further includes a gas boost pump 208 and the plasma reactor 210. For the embodiment shown, the gas boost pump 208 and the plasma reactor 210 are each arranged within the circulation gas flowpath 206 in series flow. Additionally, the gas boost pump 208 may be configured as a rotary gas pump coupled to, and driven by, a power source (not shown). In certain embodiments, the power source for the gas boost pump 208 may be the same power source for the separator (discussed below), or alternatively, may be any other suitable power source. For example, in certain embodiments, the gas boost pump 208 may be coupled to an accessory gearbox 142 (see FIG. 1), a suitable electrical power source, etc.

Referring still to the embodiment of FIG. 2, it will be appreciated that the separator 204 includes a gas outlet 214, a liquid fuel outlet 216, and an inlet 218. The contactor 202 includes a gas inlet 207, a fuel inlet 209, and an outlet 215. The plasma reactor 210 includes a plasma reactor gas inlet 212 and a plasma reactor gas outlet 213.

It will also be appreciated that the exemplary fuel oxygen reduction unit 200 depicted is operable with a fuel delivery system 146, such as a fuel delivery system 146 of the gas turbine engine including the fuel oxygen reduction unit 200 (see, e.g., FIG. 1). The exemplary fuel delivery system 146 generally includes a plurality of fuel lines, and in particular, an inlet fuel line 222 and an outlet fuel line 224. The inlet fuel line 222 is fluidly connected to the contactor 202, e.g., at the fuel inlet 209, for providing a flow of liquid fuel or inlet fuel flow 226 to the contactor 202 (e.g., from a fuel source, such as a fuel tank) and the outlet fuel line 224 is fluidly connected to the liquid fuel outlet 216 of the separator 204 for receiving a flow of deoxygenated liquid fuel or outlet fuel flow 227.

Moreover, during typical operations, a flow of stripping gas 220 flows through the circulation gas flowpath 206 from the gas outlet 214 of the separator 204, through plasma reactor 210 for reducing a free oxygen content of the stripping gas 220, and to the contactor 202, e.g., at the gas inlet 207. More specifically, during typical operations, stripping gas 220 flows from the gas outlet 214 of the separator 204, through the plasma reactor 210, and to/through the gas boost pump 208, wherein a pressure of the stripping gas 220 is increased to provide for the flow of the stripping gas 220 through the circulation gas flowpath 206. The relatively high-pressure stripping gas 220 (i.e., relative to a pressure upstream of the boost pump 208 and the fuel entering the contactor 202) is then provided to the contactor 202, wherein the stripping gas 220 is mixed with the flow of liquid fuel 226 from the inlet fuel line 222 to generate a fuel gas mixture 228. The fuel gas mixture flow 228 generated within the contactor 202 is provided to the inlet 218 of the separator 204. For example, the fuel gas mixture flow 228 exits the contactor 202 at outlet 215 and flows to the inlet 218 of the separator 204.

Generally, it will be appreciated that during operation of the fuel oxygen reduction unit 200, the liquid fuel 226 provided through the inlet fuel line 222 to the contactor 202 may have a relatively high oxygen content. The stripping gas 220 provided to the contactor 202 may have a relatively low oxygen content or other specific chemical structure. Within the contactor 202, the liquid fuel 226 is mixed with the stripping gas 220, resulting in the fuel gas mixture 228. As a result of such mixing a physical exchange may occur whereby at least a portion of the oxygen within the fuel 226 is transferred to the stripping gas 220, such that the fuel component of the mixture 228 has a relatively low oxygen content (as compared to the fuel 226 provided through inlet fuel line 222) and the stripping gas component of the mixture 228 has a relatively high oxygen content (as compared to the stripping gas 220 provided through the circulation gas flowpath 206 to the contactor 202).

Within the separator 204 the relatively high oxygen content stripping gas 220 is then separated from the relatively low oxygen content fuel 226 back into the respective flows of stripping gas 220 and liquid fuel or outlet fuel flow 227. Specifically, for the embodiment shown, the separator 204 defines a central axis 230, radial direction R, and a circumferential direction C extending about the central axis 230. Additionally, in an exemplary embodiment, the separator 204 is configured as a mechanically-driven dual separator pump, or more specifically as a rotary/centrifugal dual separator pump. Accordingly, the separator 204 includes an input shaft 232 and a single-stage separator/pump assembly 234. The input shaft 232 is mechanically coupled to the single-stage separator/pump assembly 234, and the two components are together rotatable about the central axis 230. Further, the input shaft 232 may be mechanically coupled to, and driven by, e.g., an accessory gearbox (such as the exemplary accessory gearbox 142 of FIG. 1). However, in other embodiments, the input shaft 232 may be mechanically coupled to any other suitable power source, such as an electric motor. As will be appreciated, the single-stage separator/pump assembly 234 may simultaneously separate the mixture 228 back into the flows of stripping gas 220 and outlet fuel flow 227 from the mixture 228 and increase a pressure of the separated outlet fuel flow 227 (as will be discussed in greater detail below).

Additionally, the exemplary single-stage separator/pump assembly 234 depicted generally includes an inner gas filter 236 arranged along the central axis 230, and a plurality of paddles 238 positioned outward of the inner gas filter 236 along the radial direction R. During operation, a rotation of the single-stage separator/pump assembly 234 about the central axis 230, and more specifically, a rotation of the plurality of paddles 238 about the central axis 230 (i.e., in the circumferential direction C), may generally force heavier outlet fuel flow 227 outward along the radial direction R and lighter stripping gas 220 inward along the radial direction R through the inner gas filter 236. In such a manner, the outlet fuel flow 227 may exit through the liquid fuel outlet 216 of the separator 204 and the stripping gas 220 may exit through the gas outlet 214 of the separator 204, as is indicated.

Further, it will be appreciated that with such a configuration, the outlet fuel flow 227 exiting the separator 204 through the liquid fuel outlet 216 may be at a higher pressure than the liquid fuel 226 provided through inlet fuel line 222, and further higher than the fuel/gas mixture 228 provided through the inlet 218. Such may be due at least in part to the centrifugal force exerted on such outlet fuel flow 227 and the rotation of the plurality of paddles 238. Additionally, it will be appreciated that for the embodiment depicted, the liquid fuel outlet 216 is positioned outward of the inlet 218 (i.e., the fuel gas mixture inlet) along the radial direction R. Such may also assist with the increasing of the pressure of the outlet fuel flow 227 provided through the liquid fuel outlet 216 of the separator 204.

For example, it will be appreciated that with such an exemplary embodiment, the separator 204 of the fuel oxygen reduction unit 200 may generate a pressure rise in the fuel flow during operation. As used herein, the term "pressure rise" refers to a net pressure differential between a pressure of the flow of outlet fuel flow 227 provided to the liquid fuel outlet 216 of the separator 204 (i.e., a "liquid fuel outlet pressure") and a pressure of the liquid fuel 226 provided through the inlet fuel line 222 to the contactor 202. In at least certain exemplary embodiments, the pressure rise of the outlet fuel flow 227 may be at least about sixty (60) pounds per square inch ("psi"), such as at least about ninety (90) psi, such as at least about one hundred (100) psi, such as up to about seven hundred and fifty (750) psi. With such a configuration, it will be appreciated that in at least certain exemplary embodiments of the present disclosure, the liquid fuel outlet pressure may be at least about forty-five (45) psi during operation. In other configurations, it will be appreciated that in at least certain exemplary embodiments of the present disclosure, the liquid fuel outlet pressure may be at least about seventy (70) psi during operation. For example, in at least certain exemplary embodiments, the liquid fuel outlet pressure may be at least about one hundred (100) psi during operation, such as at least about one hundred and twenty-five (125) psi during operation, such as up to about eight hundred (800) psi during operation.

Further, it will be appreciated that the outlet fuel flow 227 provided to the liquid fuel outlet 216, having interacted with the stripping gas 220, may have a relatively low oxygen content, such that a relatively high amount of heat may be added thereto with a reduced risk of the fuel coking (i.e., chemically reacting to form solid particles which may clog up or otherwise damage components within the fuel flow path). For example, in at least certain exemplary aspects, the outlet fuel flow 227 provided to the liquid fuel outlet 216 may have a free oxygen content of less than about five (5) parts per million ("ppm"), such as less than about three (3) ppm, such as less than about two (2) ppm, such as less than about one (1) ppm, such as less than about 0.5 ppm.

Moreover, as will be appreciated, the exemplary fuel oxygen reduction unit 200 depicted recirculates and reuses the stripping gas 220 (i.e., the stripping gas 220 operates in a substantially closed loop). However, the stripping gas 220 exiting the separator 204, having interacted with the liquid fuel 226, has a relatively high oxygen content. Accordingly, in order to reuse the stripping gas 220, an oxygen content of the stripping gas 220 from the outlet 214 of the separator 204 needs to be reduced. For the embodiment depicted, and as noted above, the stripping gas 220 flows through the plasma reactor 210 where the oxygen content of the stripping gas 220 is reduced. In an exemplary embodiment, the plasma reactor gas inlet 212 receives the stripping gas flow 220 from the stripping gas line 205 and the plasma reactor gas outlet 213 provides the stripping gas flow 220 back to the stripping gas line 205 downstream of the plasma reactor 210. The plasma reactor 210 is configured to reduce a free oxygen content of the stripping gas flow 220 such that an outlet oxygen content of the stripping gas flow 220 that exits the plasma reactor gas outlet 213 is lower than an inlet oxygen content of the stripping gas flow 220 that enters the plasma reactor gas inlet 212. In one or more of these configurations, a byproduct may be produced, such as water, which may be ducted away from the plasma reactor 210 (duct not depicted in the embodiment of FIG. 2). In one or more of these embodiments, the plasma reactor 210 may be configured to reduce a free oxygen content of the stripping gas 220 to less than about five percent (5%) oxygen (O2) by mass, such less than about two (2) percent (3%) oxygen (O2) by mass, such less than about one percent (1%) oxygen (O2) by mass.

The resulting relatively low oxygen content gas is then provided through the remainder of the circulation gas flowpath 206 and back to the contactor 202, such that the cycle may be repeated. In such a manner, it will be appreciated that the stripping gas 220 may be any suitable gas capable of undergoing the chemical transitions described above. For example, the stripping gas may be air from, e.g., a core air flowpath of a gas turbine engine including the fuel oxygen reduction unit 200 (e.g., compressed air bled from an HP compressor 112; see FIG. 1). However, in other embodiments, the stripping gas may instead be any other suitable gas, such as an inert gas, such as Nitrogen or Carbon Dioxide ($CO_2$), a gas mixture made up of at least 50% by mass inert gas, or some other gas or gas mixture having a relatively low oxygen content.

It will be appreciated, however, that the exemplary fuel oxygen reduction unit 200 described above is provided by way of example only. In other embodiments, the fuel oxygen reduction unit 200 may be configured in any other suitable manner. For example, in other embodiments, the stripping gas 220 may not flow through a circulation gas flowpath 206, and instead the fuel oxygen reduction unit 200 includes an open loop stripping gas flowpath, with such flowpath in flow communication with a suitable stripping gas source, such as a bleed air source, and configured to dump such air to the atmosphere downstream of the fuel gas separator 204.

Furthermore, it will be appreciated, however, that in other exemplary embodiments, the fuel oxygen reduction unit 200 may have any other suitable configuration. For example, in other embodiments, the fuel oxygen reduction unit 200 may have any other suitable separators, may have its components arranged in any other suitable flow order, may not include each of the components depicted, may include components configured in any other suitable manner, or may include other components not depicted or described herein.

Figure 3:
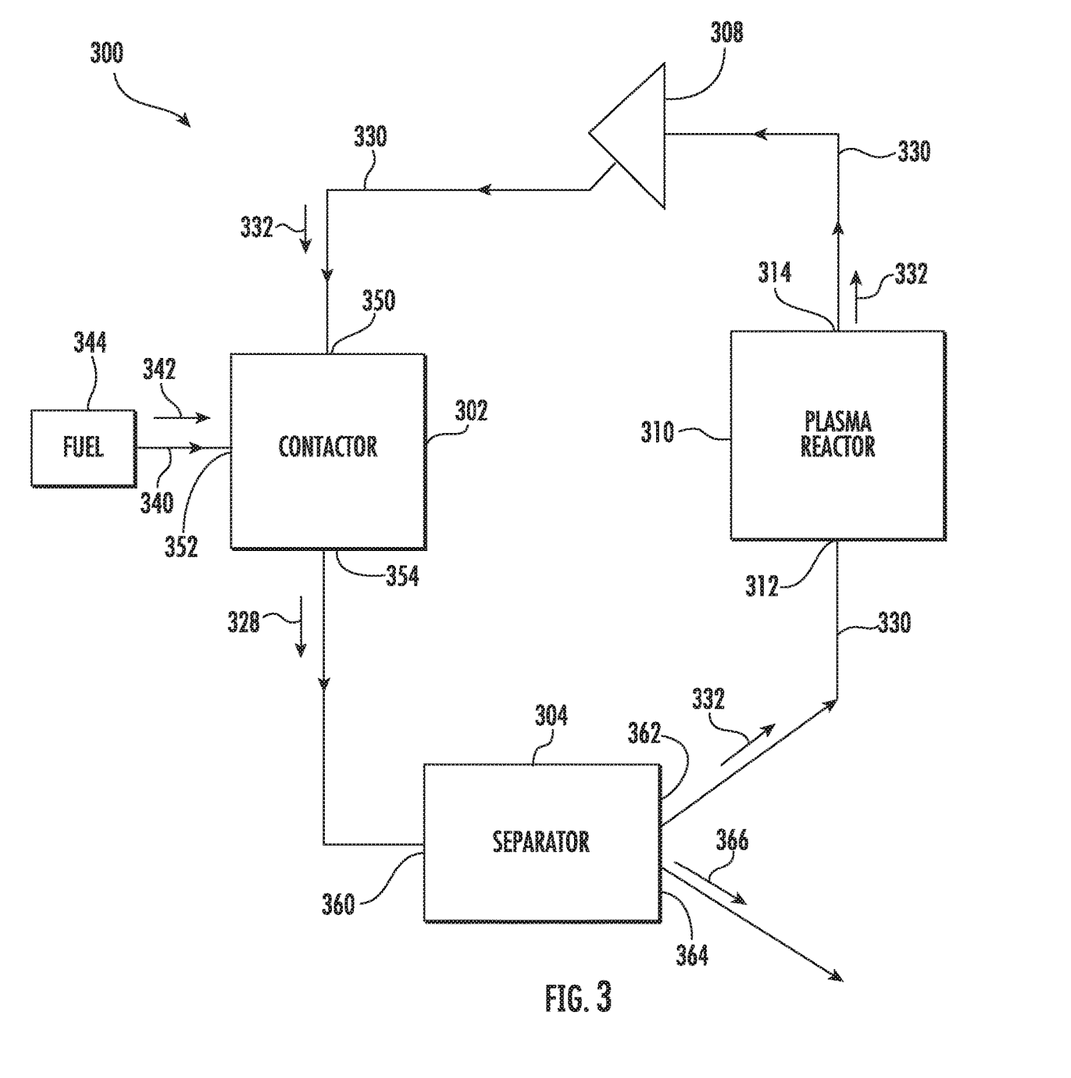
FIG. 3 is a schematic view of a fuel oxygen reduction unit in accordance with an exemplary embodiment of the present disclosure.

Referring now to FIG. 3, a schematic diagram is provided of a fuel oxygen reduction unit 300 in accordance with an exemplary embodiment of the present disclosure. Referring to FIG. 3, the fuel oxygen reduction unit 300 generally includes a contactor 302, a separator 304, a plasma reactor 310, a stripping gas line 330 that provides a stripping gas flow 332, and a fuel line 340 that provides an inlet fuel flow 342 from a fuel source 344, such as a fuel tank.

A fuel oxygen reduction unit 300 of the present disclosure includes a plasma reactor 310 configured to reduce a free oxygen content of a stripping gas flow 332 such that an outlet free oxygen content of the stripping gas flow 332 that exits the plasma reactor 310 is lower than an inlet free oxygen content of the stripping gas flow 332 that enters the plasma reactor 310. The plasma reactor 310 of the present disclosure may provide a lower temperature reaction with a lower energy input/lower power requirement into a flow of stripping gas than conventional systems. The plasma reactor 310 of the present disclosure does not require a start-up time due to warming up of the system and will start breaking chemical bonds and removing oxygen almost immediately. The plasma reactor 310 of the present disclosure requires less controls and less monitoring than conventional systems.

Referring to FIG. 3, in an exemplary embodiment, the contactor 302 is in fluid communication with the stripping gas line 330 and the fuel line 340. The contactor 302 includes a contactor gas inlet 350, a contactor fuel inlet 352, and a contactor outlet 354. The contactor gas inlet 350 is in fluid communication with the stripping gas line 330 and receives the stripping gas flow 332. The contactor fuel inlet 352 is in fluid communication with the fuel line 340 and receives the inlet fuel flow 342. The contactor 302 mixes the inlet fuel flow 342 with the stripping gas flow 332 to form a fuel/gas mixture flow 328.

Referring still to FIG. 3, in an exemplary embodiment, the separator 304 is in fluid communication with the contactor 302. The separator 304 includes an inlet 360, a gas outlet 362, and a liquid fuel outlet 364 where a flow of deoxygenated liquid fuel or outlet fuel flow 366 exits the separator 304. The separator 304 receives the fuel/gas mixture flow 328 from the contactor 302 at the inlet 360 and separates the fuel/gas mixture flow 328 back into the stripping gas flow 332 provided to the stripping gas line 330 and the outlet fuel flow 366. The stripping gas flow 332 exits the separator 304 at gas outlet 362 and travels to the plasma reactor 310 and the outlet fuel flow 366 exits the separator 304 at the liquid fuel outlet 364. In one embodiment, the outlet fuel flow 366 has a lower oxygen content than the inlet fuel flow 342.

Referring still to FIG. 3, in an exemplary embodiment, the plasma reactor 310 includes a plasma reactor gas inlet 312 and a plasma reactor gas outlet 314. The plasma reactor 310 is downstream of the separator 304. In one embodiment, the plasma reactor 310 is between, and in fluid communication with, the separator 304 and the contactor 302. The plasma reactor gas inlet 312 receives the stripping gas flow 332 that exits the separator 304 and the plasma reactor gas outlet 314 provides the stripping gas flow 332 back to the stripping gas line 330. As described above, the plasma reactor 310 is configured to reduce a free oxygen content of the stripping gas flow 332 such that an outlet free oxygen content of the stripping gas flow 332 that exits the plasma reactor gas outlet 314 is lower than an inlet free oxygen content of the stripping gas flow 332 that enters the plasma reactor gas inlet 312. In one embodiment, the contactor gas inlet 350 receives the stripping gas flow 332 that exits the plasma reactor gas outlet 314. After the stripping gas flow 332 exits the plasma reactor gas outlet 314 it may travel to/through a gas boost pump 308 to increase a pressure of the stripping gas flow 332 as it flows to the contactor 302.

Figure 4:
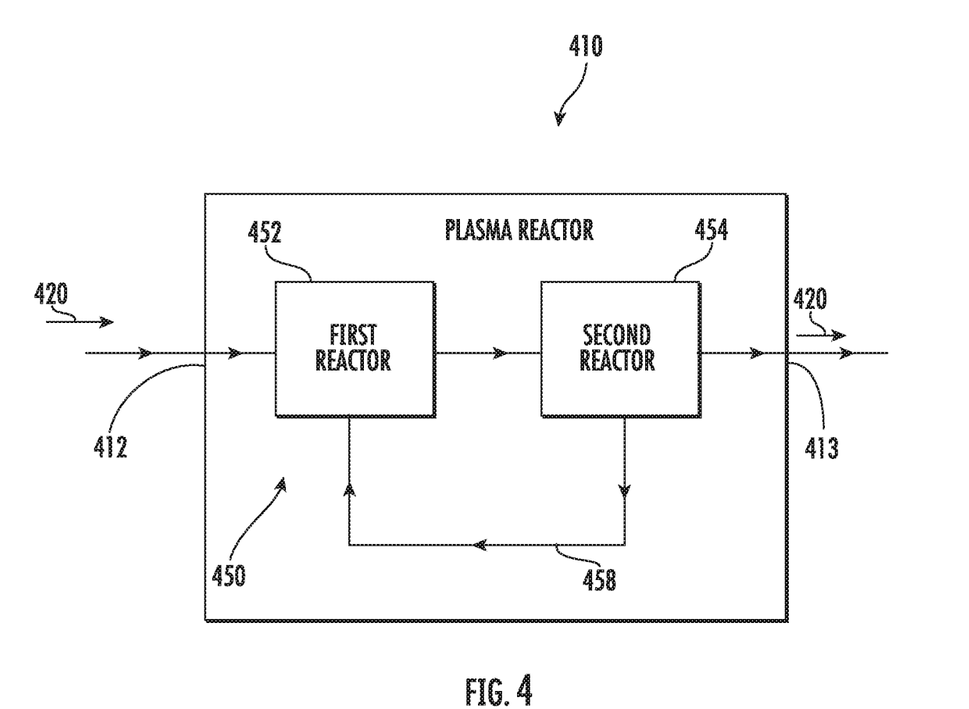
FIG. 4 is a schematic view of a plasma reactor in accordance with an exemplary embodiment of the present disclosure.

Referring now to FIG. 4, a schematic theoretical diagram is provided of a plasma reactor in accordance with an exemplary embodiment of the present disclosure. A fuel oxygen reduction unit of the present disclosure includes a plasma reactor 410 configured to reduce a free oxygen content of a stripping gas flow 420 such that an outlet free oxygen content of the stripping gas flow 420 that exits the plasma reactor 410 is lower than an inlet free oxygen content of the stripping gas flow 420 that enters the plasma reactor 410. The plasma reactor 410 of the present disclosure may provide a lower temperature reaction with a lower energy input/lower power requirement into a flow of stripping gas than conventional systems. The plasma reactor 410 of the present disclosure does not require a start-up time due to warming up of the system and will start breaking chemical bonds and removing oxygen almost immediately. The plasma reactor 410 of the present disclosure requires less controls and less monitoring than conventional systems. In at least certain exemplary embodiments, the exemplary plasma reactor 410 depicted in FIG. 4 may be incorporated into, e.g., the exemplary fuel oxygen reduction units 200, 300 depicted in FIGS. 2 and 3 and described above.

Referring to FIG. 4, as described in detail above with reference to FIG. 2, a plasma reactor 410 of the present disclosure includes a plasma reactor gas inlet 412 and a plasma reactor gas outlet 413. The plasma reactor gas inlet 412 receives a stripping gas flow 420 from a stripping gas line 205 (FIG. 2) and the plasma reactor gas outlet 413 provides the stripping gas flow 420 back to the stripping gas line 205 (FIG. 2) downstream of the plasma reactor 410.

Referring still to FIG. 4, the plasma reactor 410 is configured to reduce a free oxygen content of the stripping gas flow 420 such that an outlet free oxygen content of the stripping gas flow 420 that exits the plasma reactor gas outlet 413 is lower than an inlet free oxygen content of the stripping gas flow 420 that enters the plasma reactor gas inlet 412.

In an exemplary embodiment, a plasma reactor 410 of the present disclosure includes a reactor tube 450 that provides repetitive plasma power pulses to the stripping gas flow 420 flowing through the plasma reactor 410. For example, in one embodiment, a plasma reactor 410 of the present disclosure may include a reactor tube 450 through which the stripping gas 420 flows and is subjected to repetitive plasma power pulses with intervening times where no plasma power is deposited, but gas-phase chemistry proceeds. In one embodiment, increasing the energy in each plasma pulse leads to faster oxygen removal.

Referring still to FIG. 4, in one theoretical embodiment, the plasma reactor 410 includes a first reactor 452 that is a calorimetric bomb reactor with plasma and a second reactor 454 that is a calorimetric bomb reactor without plasma.

In an exemplary embodiment, referring to FIG. 4, the stripping gas flow 420 that enters the plasma reactor gas inlet 412 is first subjected to pulse plasma conditions in the first reactor 452. The value of the electric field is assumed and the electric current is calculated. The duration of the plasma pulse is controlled by setting the pulse energy.

In one theoretical embodiment, the stripping gas 420 exits the second reactor 454 and then is recirculated back to the first reactor 452 via recirculation flow loop 458 and can be subjected to subsequent plasma pulses. The gas residence time in the reactor corresponds to the product of the pulse repetition time and the number of recirculations through the reactors 452, 454. A plasma reactor 410 of the present disclosure can be used for any number of recirculations through the reactors 452, 454, including a single circulation through the reactors 452, 454. In another theoretical embodiment, the gas residence time in the reactor corresponds to flow rate and length only, and no recirculation would be required. In other embodiments, other reactors of varying configurations and varying geometries are contemplated.

The stripping gas 420 exits the plasma reactor 410 at plasma reactor gas outlet 413. As described above, an outlet free oxygen content of the stripping gas flow 420 that exits the plasma reactor gas outlet 413 is lower than an inlet free oxygen content of the stripping gas flow 420 that enters the plasma reactor gas inlet 412.

Figure 5:
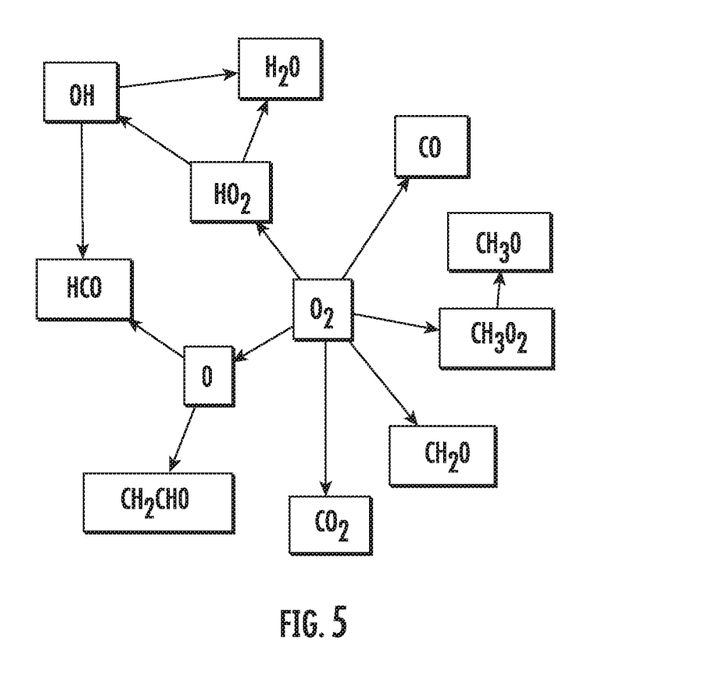
FIG. 5 is a schematic view of the conversion of oxygen into different products using a plasma reactor in accordance with an exemplary embodiment of the present disclosure.

A plasma reactor 410 of the present disclosure discharges an electric field to break and reform chemical bonds of a stripping gas flow 420 through the plasma reactor 410 thereby reducing an outlet free oxygen content of the stripping gas flow 420 that exits the plasma reactor gas outlet 413. For example, a plasma reactor 410 of the present disclosure may break down the oxygen into the following removal reactions: (A) $CH_3+O_2+M \leftrightarrow CH_3OH+M$; (B) $CH_2+O_2 \leftrightarrow H+H+CO_2$; and (C) $CH_2OH+O_2 \leftrightarrow HO_2+CH_2O$. Furthermore, referring to FIG. 5, additional example products are illustrated from breaking down and reforming oxygen using a plasma reactor 410 of the present disclosure. However, it is envisioned that a plasma reactor 410 of the present disclosure may break down the oxygen into other removal reactions.

In an exemplary embodiment, a plasma reactor 410 of the present disclosure is assessed toward the goal of removing small amounts of oxygen (<1 percent) from a gas stream of nitrogen (>90 percent), carbon dioxide (~4 percent), water vapor (<1 percent), and fuel vapor (<1 percent). A cold, weakly ionized plasma should promote the reaction of oxygen and fuel vapor at low gas temperature ~300 K. Energetic electrons (characteristic temperature 10,000-50,000 K) collide with abundant nitrogen molecules to form electronically excited nitrogen $N_2^*$, which then collide with oxygen molecules, leading to molecular dissociation and the formation of reactive O atoms. These reactive O atoms then react with fuel molecules to form cold combustion products such as CO and $CH_2O$, thereby reducing the partial pressure of $O_2$. However, it is envisioned that a plasma reactor 410 of the present disclosure may break down the oxygen into other removal reactions and in other exemplary manners.

In an exemplary embodiment of the present disclosure, a plasma reactor 410 reduces the outlet oxygen content of the stripping gas flow 420 that exits the plasma reactor gas outlet 413 to less than approximately 0.1 percent (0.1%) oxygen (O2) by mass. In other exemplary embodiments of the present disclosure, a plasma reactor 410 reduces the outlet oxygen content of the stripping gas flow 420 that exits the plasma reactor gas outlet 413 to less than approximately five percent (5%) oxygen (O2) by mass. In one exemplary embodiment of the present disclosure, a stripping gas flow 420 that enters the plasma reactor gas inlet 412 is approximately 1 percent (1%) oxygen (O2) by mass, or for example less than approximately 1 percent (1%) oxygen (O2) by mass, and a plasma reactor 410 of the present disclosure reduces the outlet oxygen content of the stripping gas flow 420 that exits the plasma reactor gas outlet 413 to less than approximately 0.1 percent (0.1%) oxygen (O2) by mass. In some embodiments, a plasma reactor 410 of the present disclosure may reduce the outlet oxygen content of the stripping gas flow 420 that exits the plasma reactor gas outlet 413 to zero oxygen (O2) by mass.

Figure 6:
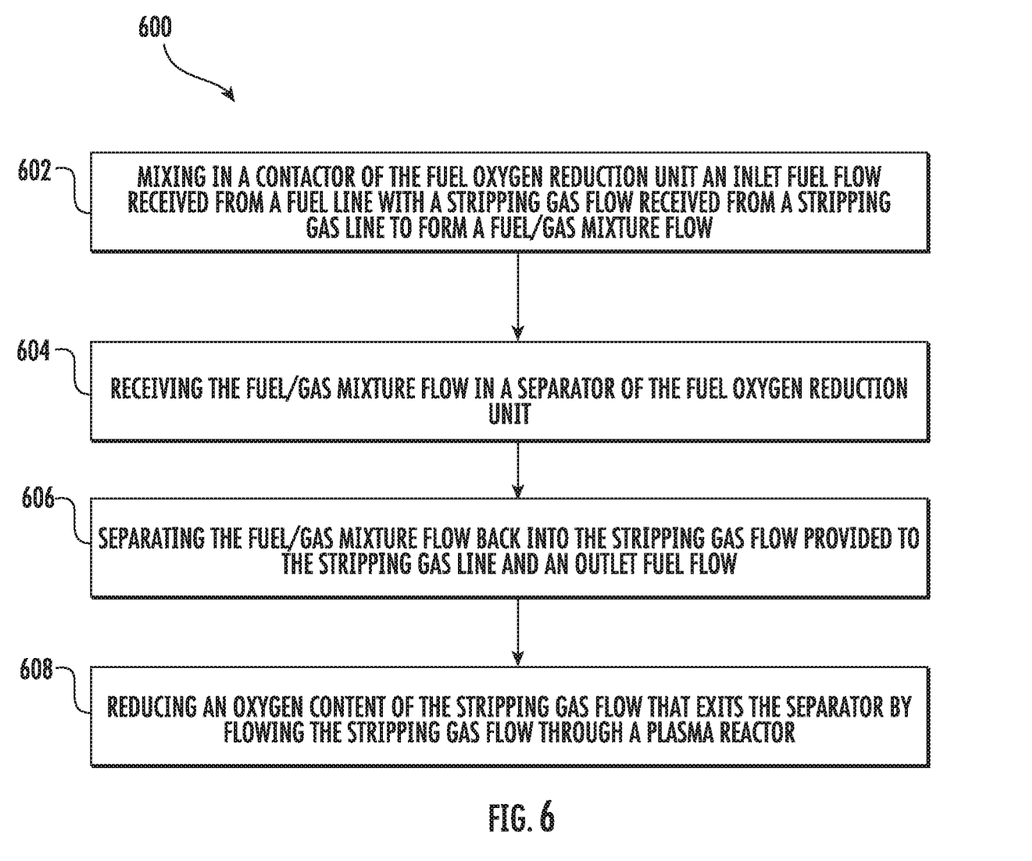
FIG. 6 is a flow diagram of a method for operating a fuel oxygen reduction unit for an aeronautical engine in accordance with an exemplary aspect of the present disclosure.

Referring now to FIG. 6, a method 600 for operating a fuel oxygen reduction unit for an aeronautical engine in accordance with an exemplary aspect of the present disclosure is depicted. The exemplary method 600 may be utilized to operate one or more of the exemplary fuel oxygen reduction units described above with reference to FIGS. 1 through 4.

For the exemplary aspect of FIG. 6, the method 600 generally includes at (602) mixing in a contactor of the fuel oxygen reduction unit an inlet fuel flow received from a fuel line with a stripping gas flow received from a stripping gas line to form a fuel/gas mixture flow. The method 600 further includes at (604) receiving the fuel/gas mixture flow in a separator of the fuel oxygen reduction unit.

For the exemplary aspect depicted, the method 600 further includes at (606) separating the fuel/gas mixture flow back into the stripping gas flow provided to the stripping gas line and an outlet fuel flow. The method 600 further includes at (608) reducing a free oxygen content of the stripping gas flow that exits the separator by flowing the stripping gas flow through a plasma reactor.

More specifically, for the exemplary aspect depicted, reducing the free oxygen content of the stripping gas flow that exits the separator by flowing the stripping gas flow through the plasma reactor at (608) includes providing the plasma reactor in fluid communication with the separator, the plasma reactor having a plasma reactor gas inlet that receives the stripping gas flow that exits the separator and a plasma reactor gas outlet that provides the stripping gas flow back to the stripping gas line, the plasma reactor configured to reduce the free oxygen content of the stripping gas flow such that an outlet free oxygen content of the stripping gas flow that exits the plasma reactor gas outlet is lower than an inlet free oxygen content of the stripping gas flow that enters the plasma reactor gas inlet.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A fuel oxygen reduction unit for an aeronautical engine, comprising:
   a stripping gas line that provides a stripping gas flow; and
   a plasma reactor in fluid communication with the stripping gas line, the plasma reactor having a plasma reactor gas inlet that receives the stripping gas flow from the stripping gas line and a plasma reactor gas outlet that provides the stripping gas flow back to the stripping gas line, the plasma reactor configured to reduce an oxygen content of the stripping gas flow such that an outlet oxygen content of the stripping gas flow that exits the plasma reactor gas outlet is lower than an inlet oxygen content of the stripping gas flow that enters the plasma reactor gas inlet.

2. The fuel oxygen reduction unit of claim 1, wherein the plasma reactor comprises a reactor tube that provides repetitive plasma power pulses to the stripping gas flow flowing through the plasma reactor.

3. The fuel oxygen reduction unit of claim 1, wherein the plasma reactor discharges an electric field to break and reform chemical bonds of the stripping gas flow thereby reducing the outlet oxygen content of the stripping gas flow that exits the plasma reactor gas outlet.

4. The fuel oxygen reduction unit of claim 1, wherein the plasma reactor reduces the outlet oxygen content of the stripping gas flow that exits the plasma reactor gas outlet to less than approximately 0.1% percent (0.1%) oxygen (O2) by mass.

5. A fuel oxygen reduction unit for an aeronautical engine, comprising:
   a stripping gas line that provides a stripping gas flow;
   a fuel line that provides an inlet fuel flow;
   a contactor in fluid communication with the stripping gas line and the fuel line, wherein the contactor mixes the inlet fuel flow with the stripping gas flow to form a fuel/gas mixture flow;
   a separator in fluid communication with the contactor, wherein the separator receives the fuel/gas mixture flow from the contactor and separates the fuel/gas mixture flow back into the stripping gas flow provided to the stripping gas line and an outlet fuel flow; and
   a plasma reactor in fluid communication with the separator, the plasma reactor having a plasma reactor gas inlet that receives the stripping gas flow that exits the separator and a plasma reactor gas outlet that provides the stripping gas flow back to the stripping gas line, the plasma reactor configured to reduce an oxygen content of the stripping gas flow such that an outlet oxygen content of the stripping gas flow that exits the plasma reactor gas outlet is lower than an inlet oxygen content of the stripping gas flow that enters the plasma reactor gas inlet.

6. The fuel oxygen reduction unit of claim 5, wherein the plasma reactor is downstream of the separator.

7. The fuel oxygen reduction unit of claim 6, wherein the plasma reactor is between, and in fluid communication with, the separator and the contactor.

8. The fuel oxygen reduction unit of claim 5, wherein the plasma reactor comprises a reactor tube that provides repetitive plasma power pulses to the stripping gas flow flowing through the plasma reactor.

9. The fuel oxygen reduction unit of claim 5, wherein the plasma reactor discharges an electric field to break and reform chemical bonds of the stripping gas flow thereby reducing the outlet oxygen content of the stripping gas flow that exits the plasma reactor gas outlet.

10. The fuel oxygen reduction unit of claim 5, wherein the plasma reactor reduces the outlet oxygen content of the stripping gas flow that exits the plasma reactor gas outlet to less than approximately 0.1% percent (0.1%) oxygen (O2) by mass.

11. The fuel oxygen reduction unit of claim 5, wherein the contactor includes a contactor gas inlet, a contactor fuel inlet, and a contactor outlet,
   wherein the contactor gas inlet is in fluid communication with the stripping gas line, and
   wherein the contactor fuel inlet is in fluid communication with the fuel line.

12. The fuel oxygen reduction unit of claim 11, wherein the contactor gas inlet receives the stripping gas flow that exits the plasma reactor gas outlet.

13. The fuel oxygen reduction unit of claim 5, wherein the outlet fuel flow has a lower oxygen content than the inlet fuel flow.

14. A method for operating a fuel oxygen reduction unit for an aeronautical engine, the method comprising:
   mixing in a contactor of the fuel oxygen reduction unit an inlet fuel flow received from a fuel line with a stripping gas flow received from a stripping gas line to form a fuel/gas mixture flow;
   receiving the fuel/gas mixture flow in a separator of the fuel oxygen reduction unit;
   separating the fuel/gas mixture flow back into the stripping gas flow provided to the stripping gas line and an outlet fuel flow; and
   reducing an oxygen content of the stripping gas flow that exits the separator by flowing the stripping gas flow through a plasma reactor.

15. The method of claim 14, wherein reducing the oxygen content of the stripping gas flow that exits the separator by flowing the stripping gas flow through the plasma reactor comprises providing the plasma reactor in fluid communication with the separator, the plasma reactor having a plasma reactor gas inlet that receives the stripping gas flow that exits the separator and a plasma reactor gas outlet that provides the stripping gas flow back to the stripping gas line, the plasma reactor configured to reduce the oxygen content of the stripping gas flow such that an outlet oxygen content of the stripping gas flow that exits the plasma reactor gas outlet is lower than an inlet oxygen content of the stripping gas flow that enters the plasma reactor gas inlet.

16. The method of claim 15, wherein the plasma reactor comprises a reactor tube that provides repetitive plasma power pulses to the stripping gas flow flowing through the plasma reactor.

17. The method of claim 15, wherein the plasma reactor discharges an electric field to break and reform chemical bonds of the stripping gas flow thereby reducing the outlet oxygen content of the stripping gas flow that exits the plasma reactor gas outlet.

18. The method of claim 14, wherein the outlet fuel flow has a lower oxygen content than the inlet fuel flow.

* * * * *